(Model.)
C. E. SWENEY.
CORN PLANTER CHECK ROWER.
No. 254,515.  Patented Mar. 7, 1882.
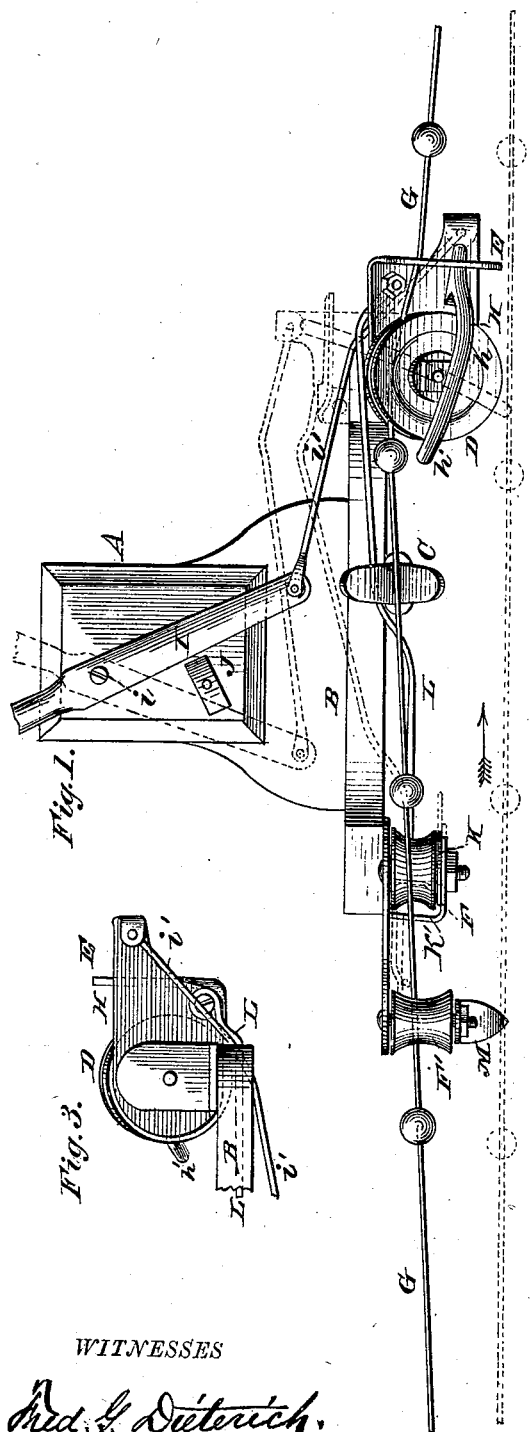
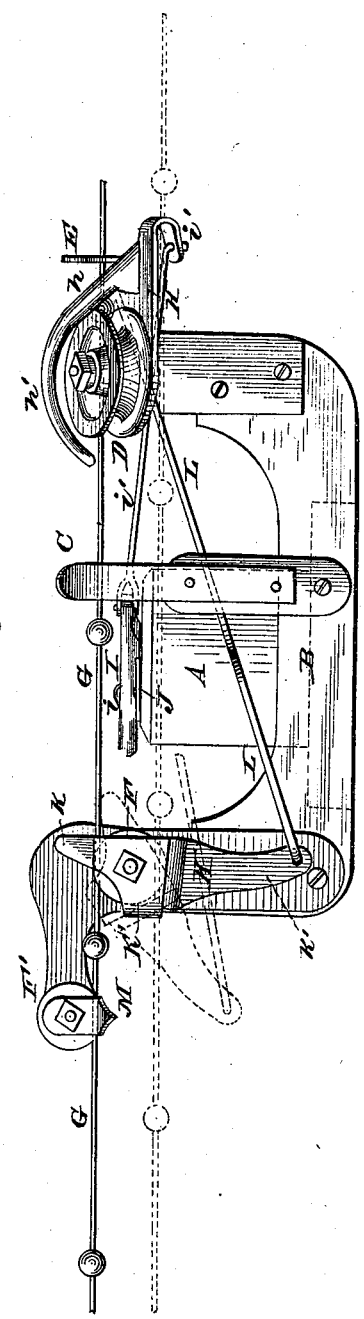
WITNESSES
Fred. G. Dieterich
P. C. Dietrich
INVENTOR
Charles E. Sweney
per W. B. Richards
Attorney

UNITED STATES PATENT OFFICE.

CHARLES E. SWENEY, OF GENESEO, ILLINOIS, ASSIGNOR TO MARY E. SWENEY AND GEORGE G. MOWRY, OF SAME PLACE.

CORN-PLANTER CHECK-ROWER.

SPECIFICATION forming part of Letters Patent No. 254,515, dated March 7, 1882.

Application filed September 29, 1881. (Model.)

*To all whom it may concern:*

Be it known that I, CHARLES E. SWENEY, a citizen of the United States, residing at Geneseo, in the county of Henry and State of Illinois, have invented certain new and useful Improvements in Corn-Planter Check-Rowers; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to improvements in corn-planter check-rowers of that class in which a tappet-wire stretched across the ground to be planted is used as the actuating mechanism.

In check-rowers of this class as generally constructed it is necessary for the driver of the planter to get off the machine when he reaches the end of the rows and remove the tappet-wire from the guide-pulleys and forked lever. He then has to get upon the machine again and turn it around ready to start in the opposite direction from the row or rows last planted, and when so turned he has to again get off the planter to place the tappet-wire in place on the check-row device.

The object of my invention is to provide means whereby the driver, without moving from his seat, when he reaches the end of the row may quickly and easily trip or throw the tappet-wire clear of the check-row devices and then turn the planter, and when he gets off to reset the anchor may put the tappet-wire in place on the check-row device.

As a new element or member in utilizing my invention I use an inclined plane or cam which can be turned out of the way to permit the tappet-wire to be put in place and used on the check-row device, and which can be swung round to remove the wire from the same devices. As an additional new member I also use a side guard for the tappet-wire on the rear pulley, which can be swung out of the way to permit the wire being thrown from the pulley. In addition to these new elements, parts, or members, my invention consists in combinations of them separately and jointly with other devices, as hereinafter described, and set forth in the claims hereto annexed.

In the accompanying drawings, which illustrate my invention, and in which the same reference-letter indicates the same part in the different figures, Figure 1 is a top plan. Fig. 2 is a side elevation. Fig. 3 is a bottom plan, seen from below, of the tripper and front pulley.

Referring to the drawings by letters, letter A represents an ordinary corn-planter seed-box, the balance of the planter not being shown.

B is an ordinary head, on which ordinary check-row devices may be seated.

C is an ordinary forked lever for receiving motion from the tappet-wire and transmitting motion to the seed-slides of the planter.

D is a guide-pulley, and E an ordinary guide-arm for the tappet-wire, located in front of the forked lever.

F is an ordinary rear and lower guide-pulley, and F' an ordinary rear and upper guide-pulley.

G is an ordinary tappet-wire, or wire with tappets or knots at intervals, for actuating the forked lever.

The foregoing parts are all parts of an ordinary corn-planter, and of a check-row attachment thereto, and need not be described here, further than to remark that they may be of any ordinary kind, and my device be equally applicable thereto.

H is a tappet-wire tripper, formed of an arm, *h*, which is journaled at one end on the same journal as the pulley D, and has its other end projecting outwardly and forwardly (when in its normal position) from said pulley. From the outer end and upper side of the arm *h* a cam-arm, *h'*, extends rearward over the pulley D, rising where it starts from the arm *h*, so as to form an incline plane, and then curving over the pulley. This arm *h'* may be formed differently from what I have shown and described, and the arm *h* may be journaled on a shaft independent of the shaft on which the pulley D is journaled, and it may be journaled on the same shaft, as herein described, and either be fixed to the pulley or independent of it, which latter method I prefer and have adopted herein. I have also shown the guide-arm E as attached to the arm *h*; but it may be attached to a fixed arm. I prefer it attached, however, as shown and described.

I is a lever, which I have shown pivoted at $i$ to the planter seed-box, and connected at one end by a rod, $i'$, with the outer end of the tripper H. The lever I may be pivoted to any part of the planter where the driver can reach it conveniently with his foot.

J is a lock or catch, against which the lever I rests when in its normal position.

K is the outside guard to hold the tappet-wire on the pulley F. It is formed of a plate journaled on the same stud-bolt as the pulley F, its upper end, $k$, projecting upward to form the guard, and its lower end, $k'$, projecting downward. A connecting-rod, L, connects the lower end, $k'$, of the guard K with the outer end of the tripper H.

M is a guard projecting outwardly from the lower side of the pulley F'.

K' is an arm extending from the guard K inwardly across and in rear of the pulley F.

The operation is as follows: The planter is driven across the field in the direction shown by the arrow at Fig. 1 with the various parts in relative positions, as shown by full lines at Figs. 1 and 2 of the drawings. When the end of the row or side of the field being planted is reached the driver places his foot on the inner end of the lever I, and, first pressing downwardly thereon to release it from the catch J, then forces it to the position shown by dotted lines at Fig. 1. The lever I in moving as last described, through the instrumentality of the connecting-rod $i'$, swings the tripper H into the position shown by dotted lines at Fig. 1, and in so swinging its pointed forward end will come beneath the tappet-wire and force it out of the groove in the pulley D, and the wire, which is always at the end of the rows, drawn taut outwardly from the planter, will by its own tension be drawn upwardly over the arm $h'$ and thrown clear and free from the machine, as shown by dotted lines at Fig. 1. As the tappet-wire raises over the higher part of the arm $h'$ it will be raised above and clear of the forked lever C. The tripper H, in moving, as last described, will through the instrumentality of the rod L swing the guard K forward and downward, and the arm K' upward, as shown by dotted lines at Fig. 2, and thus allow the tappet-wire, which has been raised from the pulley F by the upward movement of arm K', to pass off said pulley F. The driver then turns the planter, gets off to fix the anchor, places the tappet-wire on the check-rower in the evident manner, resets the parts into positions shown by full lines in the drawings, and is ready to start. In placing the tappet-wire on the check-rower the guard M will prevent it passing up at the side of the pulley F', and thus interfering with replacing it.

What I claim as new is—

1. In a check-rower, in combination with a tappet-wire and check-row devices, a tripper adapted to be swung to engage with and release the wire from the check-row devices, substantially as and for the purpose specified.

2. In a check-rower, in combination with the tappet-wire and pulley for guiding the tappet-wire to the check-row devices, a swinging tripper adapted to force the tappet-wire out of the groove of said guide-pulley, and having an incline plane, over which the wire may rise and pass over the pulley, substantially as and for the purpose specified.

3. In combination with the tappet-wire and check-row devices, a swinging tripper, H, having the ordinary guard-arm, E, attached thereto so that it will swing therewith, substantially as and for the purpose set forth.

4. In combination with a tappet-wire and with the check-row devices, a swinging tripper, H, journaled on the same shaft as the guide-pulley D, substantially as and for the purpose specified.

5. In a check-rower, the combination, with a tappet-wire, of a cam-shaped tripper adapted to be swung to engage with and release said wire from the check-row devices, substantially as and for the purpose specified.

6. In combination with the tappet-wire, check-row devices, and tripper for engaging with and throwing the tappet-wire, the lever and connecting-rod for operating the tripper, substantially as and for the purpose specified.

7. In combination with the tripper H, for engaging with and throwing the tappet-wire, and lever I, a stop, J, for holding the lever I, and thereby the tripper H, in working position, substantially as and for the purpose specified.

8. In a check-rower, in combination with the swinging tripper, a swinging guard adapted to swing to allow the tappet-wire to pass off the rear guide-pulley, substantially as and for the purpose specified.

9. In combination with the swinging tripper H, a swinging guard, K, for the pulley F, connected with the tripper by a connecting-rod, so as to have simultaneous movement therewith, substantially as and for the purpose specified.

10. In combination with the tappet-wire and check-row devices, a tripper, H, and lever I for actuating same, and a swinging guard, K, actuated through the movement of said tripper, substantially as and for the purpose specified.

11. In combination with the tappet-wire, check-row devices, and rear pulley, F', a guard, M, projecting outwardly from the lower side of the pulley F', substantially as and for the purpose specified.

12. In combination with a swinging tripper, H, a swinging arm, K', for raising the tappet-wire from the pulley F, substantially as and for the purpose specified.

13. In a check-rower, a swinging arm adapted to raise the tappet-wire from the rear guide-pulley, F, and a swinging guard adapted to swing to allow the tappet-wire to pass off from said pulley, substantially as and for the purpose specified.

14. In combination with the swinging tripper H, a swinging arm, K', and guard K, substantially as and for the purpose specified.

15. In combination with the swinging tripper H, a swinging arm, K', connected with the tripper by a connecting-rod, so as to have simultaneous movement therewith, substantially as and for the purpose specified.

16. In combination with the swinging tripper H, a swinging guard, K, and arm K' for the pulley F, connected with the tripper by a connecting-rod, so as to have simultaneous movements therewith, substantially as and for the purpose specified.

17. In combination with the tappet-wire and check-row devices, a tripper, H, and lever I for actuating same, and a swinging guard, K, and swinging arm K', actuated through the movement of said tripper, substantially as and for the purpose specified.

In testimony whereof I affix my signature in presence of two witnesses.

CHARLES E. SWENEY.

Witnesses:
J. F. KINSEY,
HUGH P. CRAWFORD.